J. H. BROWN.
FENDER.
APPLICATION FILED APR. 24, 1915.

1,159,170.

Patented Nov. 2, 1915.

Inventor
J. H. Brown

Witnesses
J. A. Ryan
J. W. Garner

By [signature], Attorney

COLUMBIA PLANOGRAPH CO., WASHINGTON, D. C.

UNITED STATES PATENT OFFICE.

JAMES H. BROWN, OF COLEMAN, WISCONSIN.

FENDER.

1,159,170.  Specification of Letters Patent.  Patented Nov. 2, 1915.

Application filed April 24, 1915. Serial No. 23,684.

*To all whom it may concern:*

Be it known that I, JAMES H. BROWN, a citizen of the United States, residing at Coleman, in the county of Marinette and State of Wisconsin, have invented certain new and useful Improvements in Fenders; and I do hereby declare the following to be a full, clear, and exact description of the invention, such as will enable others skilled in the art to which it appertains to make and use the same.

This invention relates to improvements in fenders for use in connection with wheeled and other types of cultivators and cultivator plows to raise fallen or inclined stalks of cultivated plants, such as corn or the like, and to also prevent clods, stones and the like from being thrown on the plants and the latter injured, while being cultivated in the rows; the object of the invention being to provide an improved fender of this kind which is cheap and simple in construction, is strong and durable, and which can be readily attached to any ordinary form of cultivator, and which is also adapted to be readily adjusted to any desired angle in a vertical plane.

The invention consists in the construction, combination and arrangement of devices hereinafter described and claimed.

Figure 1:
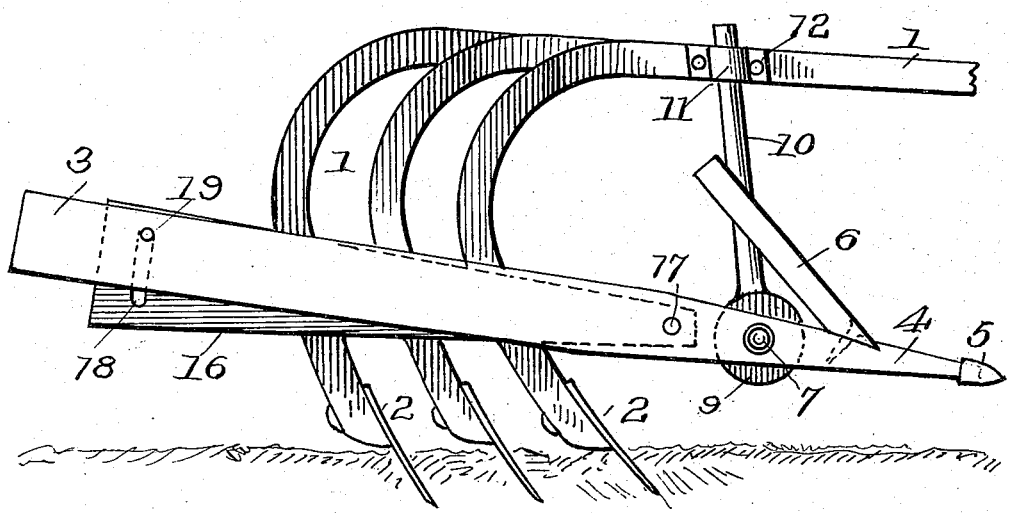
Figure 2:
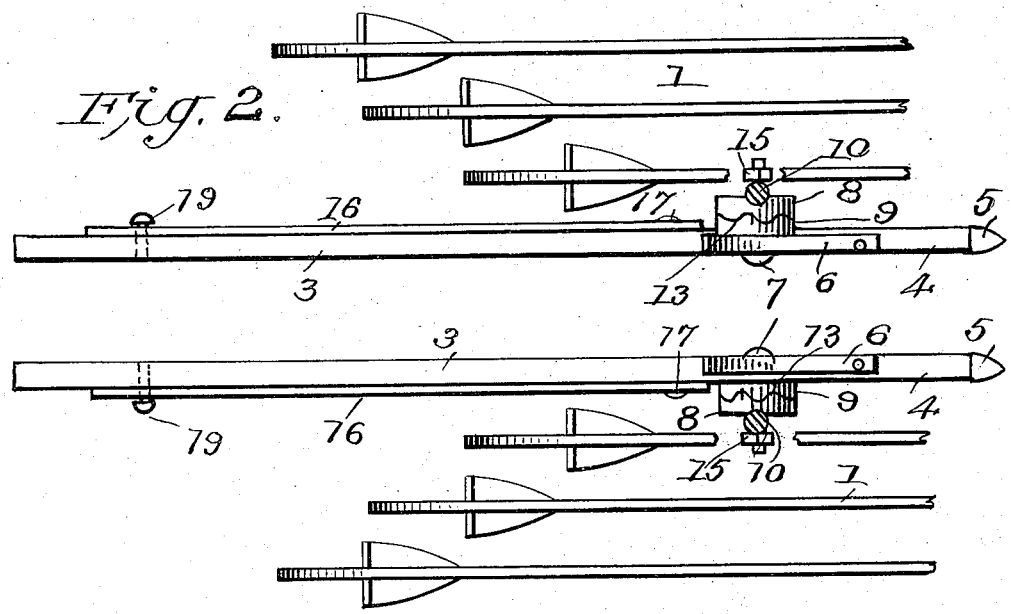

In the accompanying drawings: Figure 1 is a side elevation of a cultivator gang provided with a fender constructed and arranged in accordance with my invention. Fig. 2 is a plan, showing two gangs of cultivator plows and two of my fenders arranged in operative relation thereto.

For the purposes of this specification the beams of cultivator gangs as of a wheeled or other ordinary form of cultivator are indicated at 1, and the cultivating shovels or teeth are indicated at 2.

In accordance with my invention I provide fenders for use on opposite sides of a row and between the cultivators or cultivator gangs, to protect the plants from injury by clods, stones or the like thrown by the cultivator shovels while cultivating the growing crop. Each of my improved fenders comprises a bar 3, which in practice may be made of wood or of other suitable material, and which when used in connection with a gang of a wheeled cultivator is usually about four feet in length. However, the said bar may be of any suitable length and proportion. The bar is provided with a tapered front portion 4 and with a conical tip 5 which is preferably made of iron or steel. On the upper side of the fender bar, at a suitable distance from its front end is secured the lower end of an upwardly and rearwardly inclined lifter arm 6, the function of which is to run under and to raise fallen or bent stalks of corn or the like, when cultivating the rows. The fender bar is secured by means of a pivot bolt 7 and by a pair of washers or disks 9 to the lower end of a standard 10, the upper end of the standard being attached by any suitable means, such for instance as a cuff plate 11 and bolts 12 to the inner cultivator beam of a gang, the fenders being arranged between the gangs so as to run on opposite sides of a row of plants, as indicated in Fig. 2. The disks or washers 8 and 9 are provided on their opposing sides with radial corrugations or teeth 13, which, when the nut 15 is tightened on the bolt, serve to secure the washers or disks and the fenders at any desired adjustment of the fenders, so that the fenders may be arranged at any desired inclination. These disks are channeled on their outer sides, the bar 3 fitting in the channel of the disk 9 and the standard 10 fitting in the channel of the disk 8, as shown.

Each fender bar is provided on its outer side with a shield 16, the said shields being substantially triangular in form, with their front ends narrower and their rear ends broader than the fender bars. Each shield is pivotally connected at its front end to the fender bar, as by means of a pivot 17, and is provided near its rear end with a curved slot 18, concentric with its pivot 17, said slot being engaged by an adjusting bolt 19 with which the fender bar is provided, the shields being thus adjustably secured to the fender bars so that they may be raised or lowered, as desired. The shields prevent clods, stones and the like from rolling under them, when moved by the cultivators and injuring the growing plants.

It will be understood that my fender may be used in connection with any ordinary form of cultivator, may be readily attached and removed, and may be readily adjusted as required.

What I claim is:

1. In a device of the class described the combination of a standard for attachment to a cultivator element, a fender pivotally connected at a point intermediate its ends to the lower portion of the standards for vertical angular movement of the fender, means to secure the fender in adjusted position, a lifter arm on the fender at a point in advance of the pivotal connection and a shield on one side of the fender at a point in rear of the pivotal connection.

2. In a device of the class described the combination of a standard for attachment to a cultivator element, a fender pivotally connected to a point intermediate its ends to the lower portion of the standards for vertical angular movement of the fender, means to secure the fender in adjusted position, a lifter arm on the fender at a point in advance of the pivotal connection and a shield on one side of the fender at a point in rear of the pivotal connection, said shield being pivotally connected at its front ends to the fender and provided near its rear end with an adjusting slot, said fender having an adjusting bolt engaging said slot and securing the fender shield in adjusted position.

3. In combination with a fender, a standard for attachment to a cultivator element, a bolt pivotally connecting the fender to the lower end of the standard for vertical adjustment, and washer elements on said bolt and between and respectively attached to the standard and fender, said washer elements having radial co-engaging teeth on their opposing sides.

In testimony whereof I affix my signature in presence of two witnesses.

JAMES H. BROWN.

Witnesses:
Jos. P. Brazeau,
Mary Brazeau.

Copies of this patent may be obtained for five cents each, by addressing the "Commissioner of Patents, Washington, D. C."